(12) United States Patent
Lowth et al.

(10) Patent No.: US 10,583,478 B2
(45) Date of Patent: Mar. 10, 2020

(54) METHOD OF PROVIDING A FIXTURE FOR A CERAMIC ARTICLE, A METHOD OF MACHINING A CERAMIC ARTICLE AND A METHOD OF INVESTMENT CASTING USING A CERAMIC ARTICLE

(71) Applicant: ROLLS-ROYCE plc, London (GB)

(72) Inventors: Stewart Lowth, Nottingham (GB);
Adam Nagy, Loughborough (GB);
Stewart T Welch, Birmingham (GB)

(73) Assignee: ROLLS-ROYCE plc, London (GB)

( * ) Notice: Subject to any disclaimer, the term of this patent is extended or adjusted under 35 U.S.C. 154(b) by 103 days.

(21) Appl. No.: 15/485,629

(22) Filed: Apr. 12, 2017

(65) Prior Publication Data
US 2017/0326634 A1 Nov. 16, 2017

(30) Foreign Application Priority Data

May 12, 2016 (GB) .................................. 1608336.2

(51) Int. Cl.
*B22D 25/02* (2006.01)
*B22C 9/04* (2006.01)
(Continued)

(52) U.S. Cl.
CPC ............... *B22D 25/02* (2013.01); *B22C 7/02* (2013.01); *B22C 9/04* (2013.01); *B22C 9/108* (2013.01);
(Continued)

(58) Field of Classification Search
CPC .. B22C 9/10; B22C 9/108; B28B 1/52; B23Q 3/06; B23Q 3/08; B23Q 3/084; B23C 3/13; B23C 2240/00; B23C 2270/08
See application file for complete search history.

(56) References Cited

U.S. PATENT DOCUMENTS 3,711,929 A * 1/1973 Blakey ................... B23Q 3/107
 269/276
4,615,678 A 10/1986 Moermann et al.
(Continued)

FOREIGN PATENT DOCUMENTS

DE 10 2006 027397 A1 12/2007
DE 10 2009 021418 A1 11/2010
(Continued)

OTHER PUBLICATIONS

Feb. 22, 2017 Search Report issued in British Patent Application No. 1608336.2.
(Continued)

*Primary Examiner* — Kevin E Yoon
*Assistant Examiner* — Jacky Yuen
(74) *Attorney, Agent, or Firm* — Oliff PLC

(57) ABSTRACT

A method of providing datum features on a ceramic article including the steps of providing a ceramic member having a plurality of substantially parallel holes extending into the ceramic member. Providing a plurality of tubular mounts, the cross-sectional area of each tubular mount being less than the cross-sectional area of the corresponding hole. Applying adhesive to the exterior surface of each one of the tubular mounts and inserting an adhesive covered tubular mount into each one of the holes. Providing a fixture member having a plurality of substantially parallel projections extending from predetermined positions. Positioning the ceramic member on the fixture member such that each projection locates in one of the tubular mounts and fixes the tubular mounts at the predetermined positions. The ceramic article may be removed from the fixture member or located in a machine tool using the fixture member and machining the ceramic article.

7 Claims, 8 Drawing Sheets

(51) Int. Cl.
*B22C 9/10* (2006.01)
*B23Q 3/18* (2006.01)
*B28B 11/12* (2006.01)
*B22C 7/02* (2006.01)
*B22C 9/24* (2006.01)
*B22D 29/00* (2006.01)
*B23Q 3/08* (2006.01)

(52) U.S. Cl.
CPC .............. *B22C 9/24* (2013.01); *B22D 29/001* (2013.01); *B23Q 3/084* (2013.01); *B23Q 3/18* (2013.01); *B28B 11/12* (2013.01)

(56) References Cited

U.S. PATENT DOCUMENTS

| | | |
|---|---|---|
| 5,234,047 A | 8/1993 | Rose |
| 5,339,888 A | 8/1994 | Tanner, Jr. |
| 5,465,780 A | 11/1995 | Muntner et al. |
| 5,735,335 A | 4/1998 | Gilmore et al. |
| 6,179,909 B1 | 1/2001 | Banzawa et al. |
| 7,296,615 B2 | 11/2007 | Devine, II et al. |
| 7,458,411 B2 | 12/2008 | Prigent et al. |
| 8,784,021 B2 * | 7/2014 | Luksch .............. A61C 13/0022 409/132 |
| 2003/0132539 A1 | 7/2003 | Althoff et al. |
| 2004/0072121 A1 | 4/2004 | Filser et al. |
| 2011/0052443 A1 * | 3/2011 | Hanlon ................ B22D 27/045 420/448 |
| 2011/0268525 A1 * | 11/2011 | Karpowitz ......... A61C 13/0022 409/225 |
| 2016/0256918 A1 | 9/2016 | Schilling |

FOREIGN PATENT DOCUMENTS

| | | |
|---|---|---|
| EP | 0160797 A1 | 11/1985 |
| EP | 0455854 A1 | 11/1991 |
| GB | 1453434 A | 10/1976 |
| GB | 2 346 340 A | 8/2000 |
| WO | 01/97707 A1 | 12/2001 |
| WO | 02/45614 A1 | 6/2002 |
| WO | 2008/155513 A1 | 12/2008 |

OTHER PUBLICATIONS

Oct. 16, 2017 Search Report issued in European Patent Application No. 17166193.7.

Mar. 5, 2018 Search Report issued in European Patent Application No. 17166193.

* cited by examiner

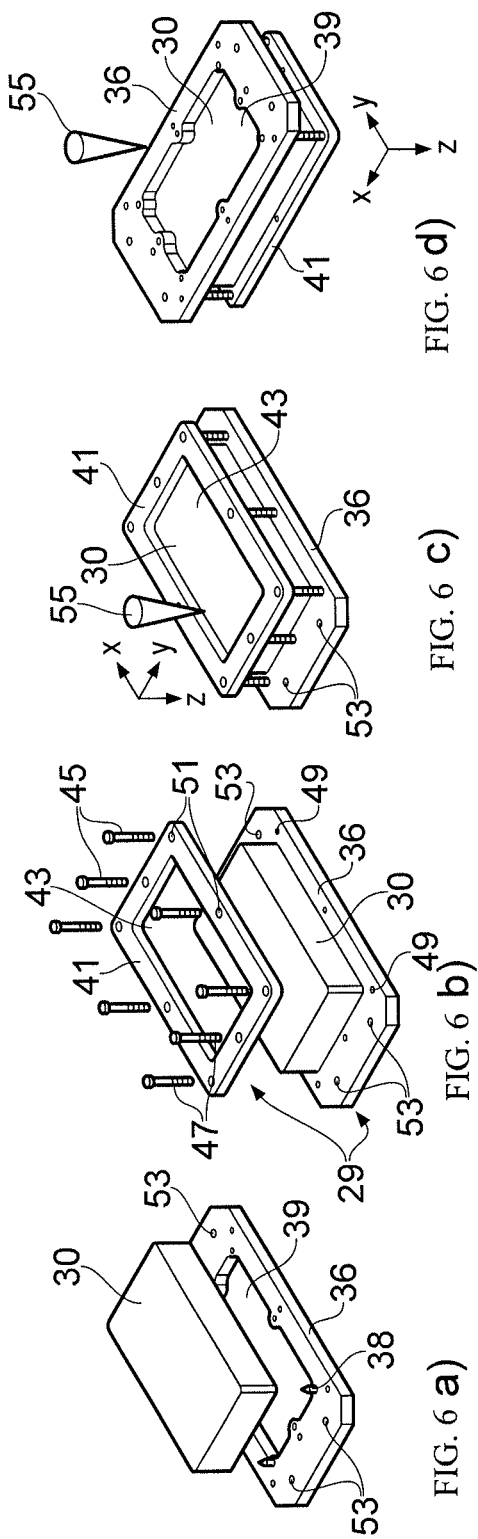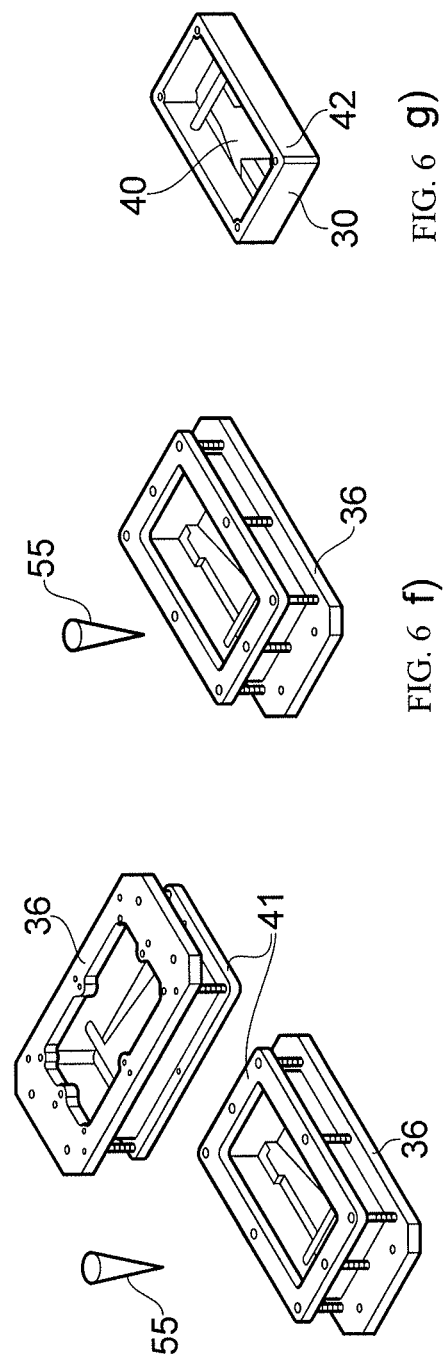

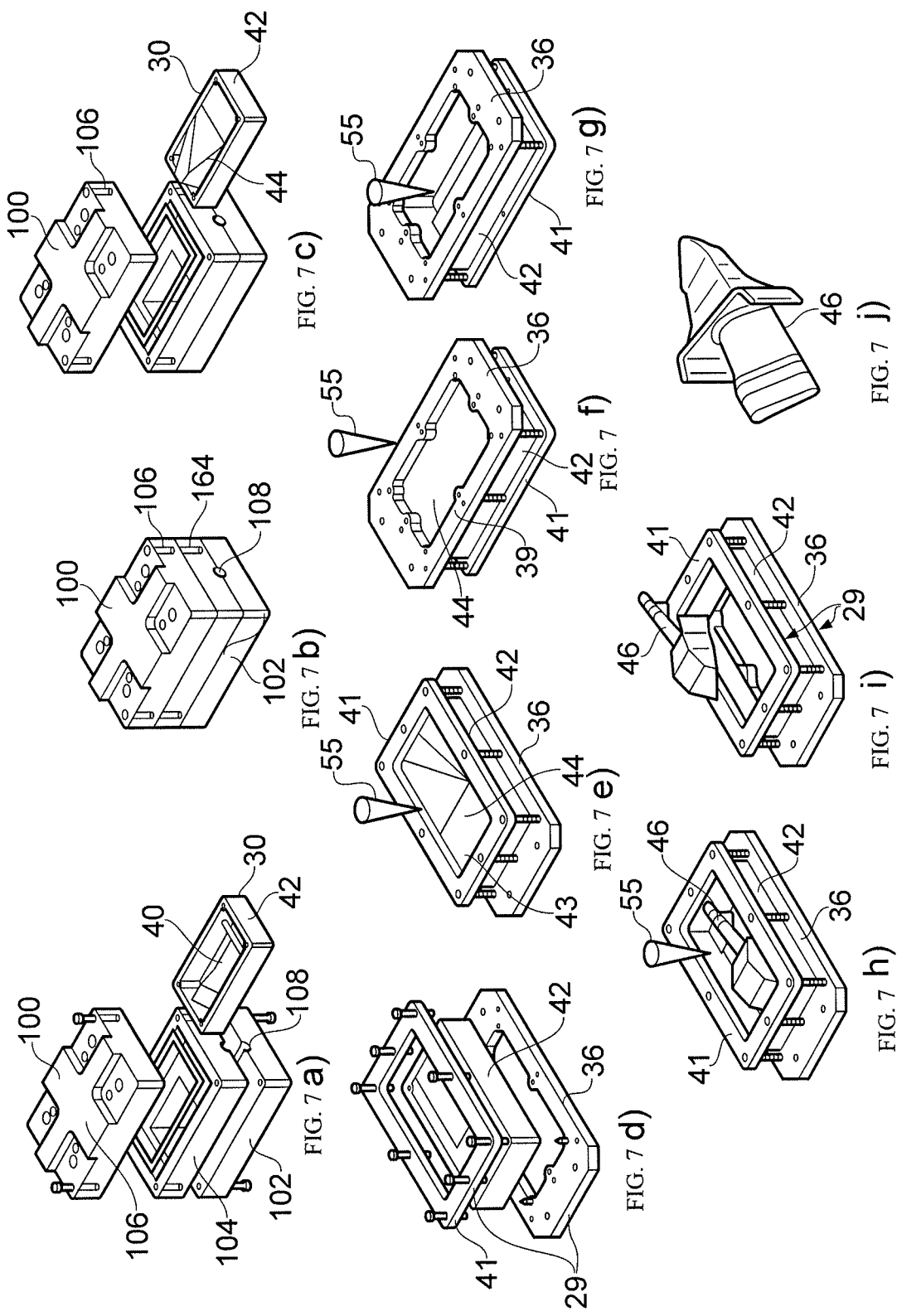

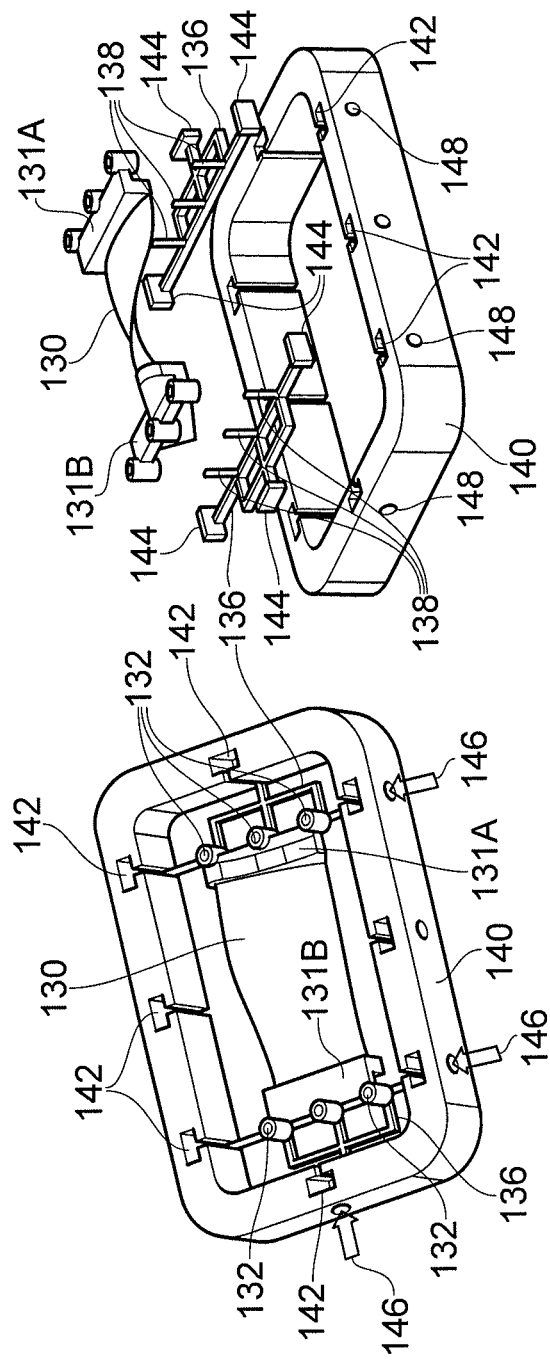

METHOD OF PROVIDING A FIXTURE FOR A CERAMIC ARTICLE, A METHOD OF MACHINING A CERAMIC ARTICLE AND A METHOD OF INVESTMENT CASTING USING A CERAMIC ARTICLE

BACKGROUND

The present disclosure relates to a method of providing a fixture for a ceramic article in a machine tool such that the ceramic article may be machined to a required shape. The present disclosure also relates to a method of machining a ceramic article, e.g. machining a ceramic block into a ceramic casting core. The present disclosure also relates to a method of investment casting using a ceramic article, e.g. ceramic casting core.

A fixture's role within manufacturing is to allow the repeatable deterministic positioning of an article, or a component, relative to a particular manufacturing process or machining tool. A fixture ensures that the article, or component, is positioned in such a manner that it is held within the working volume of the manufacturing process, or machining tool, relative to a working datum. Accurate positioning of an article, or component, relative to the manufacturing process, or machining tool, is vital for the repeatable production of accurate parts, especially in high volume manufacturing processes.

To mathematically define the position of a ridged body in three-dimensional space, six parameters must be defined, the position in the X-direction, position in the Y-direction, the position in the Z-direction, rotation about the X-axis, rotation about the Y-axis and rotation about the Z-axis. These six spatial parameters are described as the degrees of freedom of the rigid body. A fixture's role is to deterministically set the position of the article, or component, by controlling the degrees of freedom of the article or component, e.g. preventing movement of the article or component. Once the position of an article, or component, has been determined relative to a datum coordinate frame, the features of the article, or component, may be referenced repetitively.

When fixturing a rigid prismatic article, or component, 1 its position in three dimensional (3D) space is most commonly determined using a 3-2-1 location strategy. The articles degrees of freedom are restrained first through three points 2 of contact in a plane, two points 3 of contact in a line and finally one point 4 of contact, which provide complete location of the article 1, see FIG. 1.

The contact points of the article which restrain movement of the article are critical features that must be tightly controlled to achieve a high level of repeatability in the location strategy. Otherwise, as each article varies slightly, the deformations will propagate to successive manufacturing processes, or machining steps, based upon location error and this will result in a large amount of variability from article to article. This is not a significant problem for most metallic articles, or other hard material articles, as these points of contact can be consistently maintained. However, for brittle material articles with low surface wear resistance, for example sintered ceramic articles, this may be a significant problem. When a brittle material article is placed against these contact points, the contact points may produce wear of the brittle material article and this may alter the position of the brittle material article upon relocation. Furthermore, the contact points may also chip, or crack, the surface of brittle material articles at these critical locations. The damage to the brittle material articles may increase when the brittle material articles are subjected to restraint and manufacturing processes. Dimensional variability caused by the sintering of ceramics may also compromise the location repeatability of ceramic articles, or ceramic components, making it difficult to utilise a stable reference datum.

Accordingly the present disclosure seeks to provide a method of providing a fixture for a ceramic article which reduces, or overcomes, the above mentioned problem.

SUMMARY

According to a first aspect of the present disclosure there is provided a method of providing a fixture for a ceramic article comprising the steps of:—a) providing a ceramic member, b) providing at least one fixture member having at least one datum feature, c) applying adhesive to one or more of the ceramic member and the at least one fixture member, d) positioning the ceramic member on the at least one fixture member, e) maintaining the ceramic member on the at least one fixture member for a time sufficient for the adhesive to fix the ceramic member on the at least one fixture member to provide the ceramic article with at least one datum feature, at least the fixture member forming a fixture.

Step a) may comprise providing at least one setting mount, step c) comprises applying adhesive to a portion of the exterior surface of the ceramic article or applying adhesive to a corresponding portion of a surface of the at least one setting mount and step d) comprises positioning the ceramic member on the fixture member such that the at least one setting mount locates the ceramic member on the fixture member.

Step a) may comprise providing at least one setting mount, step b) comprises providing a recess in a surface of the fixture member, step c) comprises applying adhesive to a portion of the exterior surface of the ceramic article or applying adhesive to a corresponding portion of a surface of the at least one setting mount and step d) comprises positioning the ceramic member on the fixture member such that the setting mount locates in the recess in the surface of the fixture member.

Step a) may comprise providing a plurality of substantially parallel holes extending into the ceramic member, providing a plurality of tubular setting mounts, the cross-sectional area of each tubular setting mount being less than the cross-sectional area of the corresponding hole, step b) comprises providing a plurality of substantially parallel projections extending from the fixture member at predetermined positions, step c) comprises applying adhesive to the exterior surfaces of the tubular setting mounts or the surfaces of the holes in the ceramic member, inserting a tubular setting mount into each one of the holes, step d) comprises positioning the ceramic member on the fixture member such that each projection locates in a respective one of the tubular setting mounts, and step e) comprises maintaining the ceramic member on the fixture member for a time sufficient for the adhesive to fix the tubular setting mounts at predetermined positions to provide the ceramic article with at least one datum feature.

Step c) may comprise inserting an adhesive covered tubular setting mount into each one of the holes.

Step a) may comprise providing a plurality of substantially parallel holes extending into the ceramic member, step b) comprises providing a fixture member comprising a rectangular frame and providing a plurality of substantially parallel projections extending from the fixture member at predetermined positions, the projections being surrounded by the rectangular frame, step c) comprises applying adhesive to the interior surfaces of the rectangular frame or to the exterior surfaces of the ceramic member, step d) comprises positioning the ceramic member on the fixture member such that each projection locates in a respective one of the holes, and step e) comprises maintaining the ceramic member on the fixture member for a time sufficient for the adhesive to fix the ceramic member in the fixture member to provide the ceramic article with at least one datum feature.

Step c) may comprise applying adhesive to the exterior surface of each of the tubular setting mounts. Step c) may comprise applying adhesive to the surface of each of the holes in the ceramic member.

The method may comprise the step of removing the ceramic article from the fixture member.

The ceramic member may comprise a block having a planar surface, the planar surface having the plurality of substantially parallel holes extending into the block and the fixture member is a fixture plate.

The block may have a plurality of planar surfaces. The block may be a polyhedron. The block may be a regular polyhedron. The block may have six planar surfaces. The block may be a parallelepiped, e.g. a rectangular parallelepiped, a cube or a cuboid.

The ceramic member may comprise a central portion and a frame surrounding the central portion, the frame having a planar surface, the planar surface having the plurality of substantially parallel holes extending into the frame, the central portion having at least one contoured surface spaced from the planar surface, and the fixture member is a fixture plate. The central portion may have two contoured surfaces spaced from the planar surface.

The frame may be polygonal, e.g. rectangular or square.

The ceramic member may have at least three parallel holes and the fixture plate having a corresponding number of projections.

The fixture plate may have a projection provided at each one of the corners of a rectangle, the planar surface is substantially rectangular or the planar surface is the difference between two rectangular areas and a hole is provided at each one of the corners of the planar surface.

The fixture plate may have a projection provided on two opposite sides of the rectangle and the ceramic member has a hole provided on two corresponding opposite sides of the rectangular planar surface.

The fixture plate may have a projection provided on each side of the rectangle and the ceramic member has a hole provided on each side of the rectangular planar surface.

The holes may be circular or other suitable shape. The tubular setting mounts may be cylindrical. The projections may be cylindrical. The holes, the tubular setting mounts and the projections may have the same cross-sectional shape, e.g. the holes may be circular, the tubular setting mounts are cylindrical and the projections are cylindrical.

The internal diameter of the holes in the ceramic member may be 20% greater than the external diameter of the tubular setting mounts.

The holes may be provided in the ceramic member after the ceramic member has been sintered. The holes may be provided by drilling. The holes may be provided in the ceramic member during the injection moulding of the ceramic into a die. The holes may be provided by projections extending into the die.

The tubular setting mounts may comprise a plastic material, a metal or other suitable material.

The fixture member may comprise a frame defining a window.

The method may comprise a step f) of providing at least one clamping member, removably securing the clamping member to the fixture member to clamp the ceramic member between the fixture member and the clamping member, the fixture member and the clamping member forming a fixture.

The clamping member may comprise a frame and a window.

Step a) may comprise providing a plurality of substantially parallel holes extending into the ceramic member, step b) comprises providing a plurality of substantially parallel projections extending from the at least one fixture member at predetermined positions, the cross-sectional area of one of the projections being the same as the cross-sectional area of the corresponding hole, the cross-sectional area of one of the remaining projections being the less than the cross-sectional area of the corresponding hole, step c) comprises applying adhesive to the exterior surface of each one of the projections or the interior surfaces of the holes, step d) comprises positioning the ceramic member on the at least one fixture member such that each projection locates in a respective one of the holes, and step e) comprises maintaining the ceramic member on the at least one fixture member for a time sufficient for the adhesive to fix the projections at the predetermined positions in holes to provide a ceramic article with at least one datum feature.

The at least one fixture member may comprise a framework.

The at least one fixture member may comprise two frameworks, each framework having a substantially parallel projections extending from the at least one fixture member at predetermined positions.

The at least one framework may be located in a frame.

According to a second aspect of the present disclosure there is provided a method of machining a ceramic article comprising the steps of:—a) providing a ceramic member, providing at least one setting mount, b) providing at least one fixture member having at least one datum feature, c) applying adhesive to a portion of the exterior surface of the ceramic article or applying adhesive to a corresponding portion of a surface of the at least one setting mount, d) positioning the ceramic member on the fixture member such that the at least one setting mount locates the ceramic member on the fixture member, e) maintaining the ceramic member on the at least one fixture member for a time sufficient for the adhesive to fix the ceramic member on the at least one setting mount to provide the ceramic article with at least one datum feature, f) providing at least one clamping member, removably securing the clamping member to the fixture member to clamp the ceramic member between the fixture member and the clamping member, g) removably locating the fixture member on a machine tool, i) machining the ceramic article to the required shape and dimensions and k) removing the machined ceramic article from the machine tool.

Step a) may comprise providing a plurality of substantially parallel holes extending into the ceramic member, providing a plurality of tubular setting mounts, the cross-sectional area of each tubular mount being less than the cross-sectional area of the corresponding hole, step b) comprises providing a plurality of substantially parallel projections extending from the fixture member at predetermined positions, step c) comprises applying adhesive to the exterior surfaces of the tubular setting mounts or the surfaces of the holes in the ceramic member, inserting a tubular setting mount into each one of the holes, step d) comprises positioning the ceramic member on the at least one fixture member such that each projection locates in a respective one of the tubular setting mounts and step e) comprises maintaining the ceramic member on the at least one fixture member for a time sufficient for the adhesive to fix the tubular setting mounts at predetermined positions to provide a ceramic article with at least one datum feature.

Step c) may comprise inserting an adhesive covered tubular setting mount into each one the holes.

The ceramic member may comprise a block having a planar surface, the planar surface having the plurality of substantially parallel holes extending into the block and the fixture member is a fixture plate.

The ceramic member may comprise a central portion and a frame surrounding the central portion, the frame having a planar surface, the planar surface having the plurality of substantially parallel holes extending into the frame, the central portion having at least one contoured surface spaced from the planar surface, and the fixture member is a fixture plate.

The fixture plate may have a projection provided at each one of the corners of a rectangle, the planar surface is substantially rectangular or the planar surface is the difference between two rectangular areas and a hole is provided at each one of the corners of the planar surface.

The ceramic member may be machined to produce a machined ceramic article located in a rectangular ceramic frame and the holes are positioned in the planar surface on the rectangular ceramic frame.

The fixture member may comprise a frame defining a window.

The clamping member may comprise a frame and a window.

The machining may comprise machining the ceramic member through the window in the fixture member and/or machining the ceramic member through the window in the clamping member.

The machining may comprise milling, drilling or grinding.

The machined ceramic article may be a ceramic casting core.

The ceramic casting core may be for a turbine blade or for a turbine vane.

According to a third aspect of the present disclosure there is provided a method of investment casting comprising the steps of:—a) providing a ceramic member, providing at least one setting mount, b) providing at least one fixture member having at least one datum feature, c) applying adhesive to a portion of the exterior surface of the ceramic article or applying adhesive to a corresponding portion of a surface of the at least one setting mount, d) positioning the ceramic member on the fixture member such that the at least one setting mount locates the ceramic member on the fixture member, e) maintaining the ceramic member on the at least one fixture member for a time sufficient for the adhesive to fix the ceramic member on the at least one setting mount to provide the ceramic article with at least one datum feature, f) providing at least one clamping member, removably securing the clamping member to the fixture member to clamp the ceramic member between the fixture member and the clamping member, g) removably locating the fixture member on a machine tool, i) machining the ceramic article to the required shape and dimensions, k) may comprise removing the machined ceramic article from the machine tool, l) encapsulating the ceramic article in a fugitive material pattern, m) providing a ceramic shell around the fugitive material pattern, n) removing the fugitive material pattern from the ceramic shell and ceramic article, o) pouring molten metal into the ceramic shell and solidifying the metal to form a metal article, and p) removing the ceramic article from the metal article.

Step I) may comprise maintaining the ceramic article clamped between the fixture member and the clamping member before encapsulating the ceramic article in a fugitive material pattern, removably locating the fixture member on a machine tool, machining the fugitive material pattern to the required shape and dimensions, removing the machined fugitive material pattern from the machine tool and removing the fixture member and the clamping member from the machined fugitive material pattern.

Step I) may comprise removing the fixture member and the clamping member from the machined ceramic article before encapsulating the ceramic article in the fugitive material pattern.

The fugitive material may be wax.

The metal article may be a turbine blade or a turbine vane.

The metal may be a nickel base superalloy, a cobalt base superalloy or an iron base superalloy.

The method may comprise directionally solidifying the metal to form a directionally solidified metal article or a single crystal metal article.

The skilled person will appreciate that except where mutually exclusive, a feature described in relation to any one of the above aspects of the invention may be applied mutatis mutandis to any other aspect of the invention.

BRIEF DESCRIPTION OF THE DRAWINGS

Embodiments of the invention will now be described by way of example only, with reference to the Figures, in which:—

FIGS. 6a) to 6g) are schematic perspective views of steps in a method of machining a ceramic article according to the present disclosure.

FIGS. 7a) to 7j) are schematic perspective views of steps in a method of investment casting using a ceramic article according to the present disclosure.

FIG. 10 is a perspective view of a further method of providing location features on a ceramic prismatic article in a method of providing fixturing for a ceramic article according to the present disclosure.

FIG. 11 is an exploded perspective view of the further method of providing location features on a ceramic prismatic article in a method of providing fixturing for a ceramic article shown in FIG. 10.

DETAILED DESCRIPTION

Figure 1:
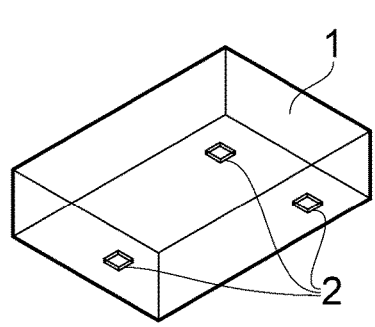
FIGS. 1a) to 1c) are schematic perspective views of steps in a prior art method of fixturing a rigid prismatic article.
Figure 1:
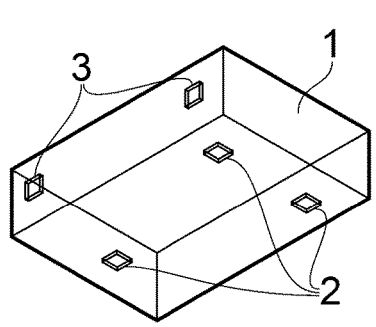
Figure 1:
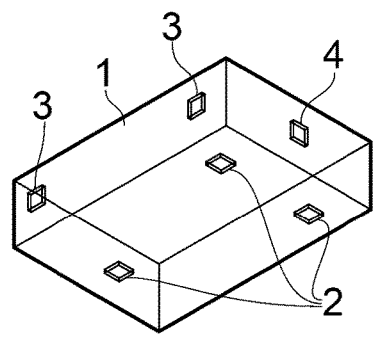
Figure 2:
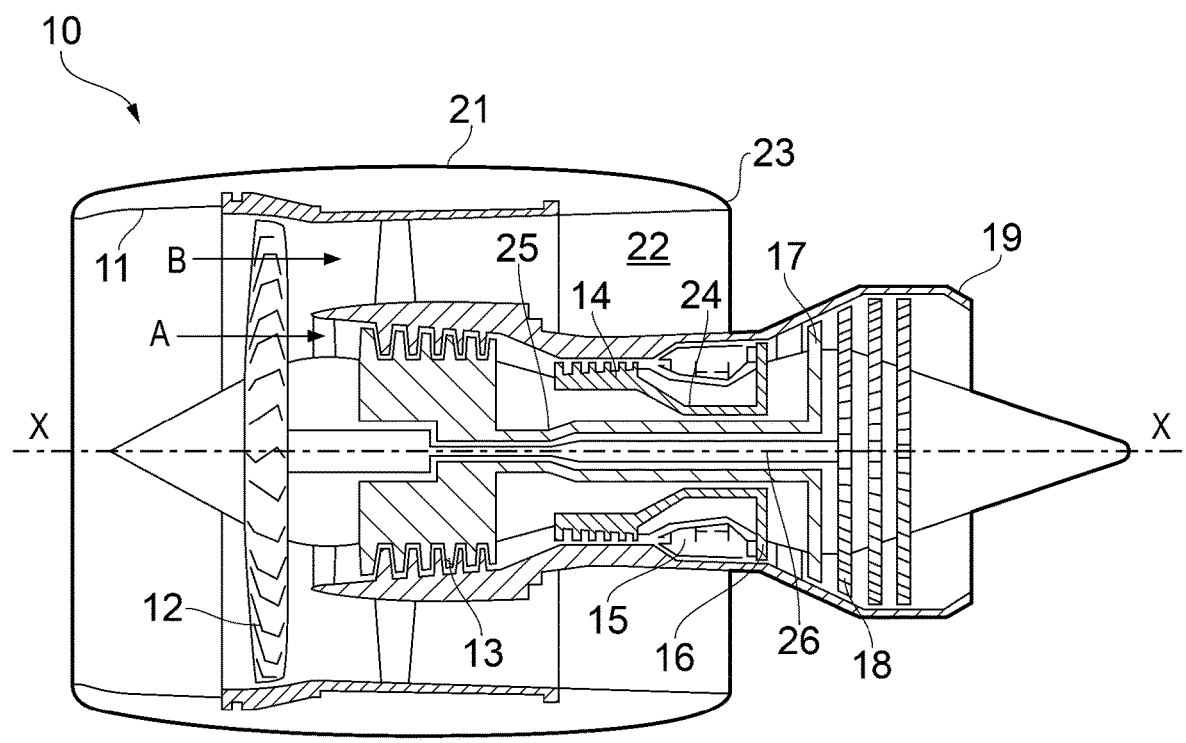
FIG. 2 is a sectional side view of a gas turbine engine.

With reference to FIG. 2, a gas turbine engine is generally indicated at 10, having a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and an exhaust nozzle 19. A nacelle 21 generally surrounds the engine 10 and defines the intake 11, a bypass duct 22 and a bypass duct exhaust nozzle 23.

The gas turbine engine 10 works in the conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, intermediate pressure compressor 13 and fan 12, each by suitable interconnecting shafts 24, 25 and 26 respectively.

A method of fixturing a ceramic article according to the present disclosure is shown in FIGS. 3 to 6. The method of fixturing ceramic article comprises providing a fixture for the ceramic article, providing location features on the ceramic article to enable the ceramic article to be repeatedly inserted into and removed from the fixture while consistently locating the ceramic article in the fixture and mounting the ceramic article in the fixture.

The method of providing the location features on the ceramic article is shown in FIGS. 3a) to 3e), and comprises providing a ceramic member 30 having a plurality of substantially parallel holes 32 extending into the ceramic member 30, as shown in FIG. 3a). In this example the ceramic member 30 is a prismatic ceramic block 30 having a first planar surface 31 and the first planar surface 31 has a plurality of substantially parallel holes 32 extending into the ceramic block 30. In this example the ceramic member 30 has a second planar surface 33 and the second planar surface 33 is parallel to the first planar surface 31. The holes 32 may be provided in the ceramic member 30 after the ceramic member 30 has been sintered, for example the holes 32 may be provided in the planar surface 31 of the ceramic member 30 by drilling. Alternatively, the holes 32 may be provided in the planar surface 31 of the ceramic member 30 during the injection moulding of the ceramic into an injection moulding die and the ceramic block 30 with holes 32 is then sintered. The holes 32 may be provided in the first planar surface 31 of the ceramic block 30 during the injection moulding of the ceramic into the die by providing projections extending into the injection moulding die. The ceramic member 30 may comprise any suitable ceramic for example zirconia, yttria, alumina, silica, zircon or a mixture of one or more of these for example a blend of alumina, silica, zircon, zirconia and yttria.

A plurality of tubular setting mounts 34 are provided and the cross-sectional area of each tubular mount 34 is less than the cross-sectional area of the corresponding hole 32 in the first planar surface 31 of the ceramic member 30. An adhesive 35 is applied to the exterior surface of each one of the tubular setting mounts 34 and an adhesive covered tubular mount 34 is inserted into each one of the holes 32 in the first planar surface 31 of the ceramic block 30, as shown in FIG. 3b). The tubular setting mounts may comprise a plastic material, e.g. nylon, polytetrafluoroethylene (PTFE), polycarbonate etc., a metal or other suitable material.

A fixture member 36 is provided and the fixture member 36 has a plurality of substantially parallel projections 38 extending from a first planar surface 37 of the fixture member 36 at predetermined positions, as shown in FIG. 3c). In this example the fixture member 36 is a fixture plate or fixture frame. The fixture frame 36 and the projections 38 may comprise a suitable metal, e.g. aluminium or steel. The fixture frame 36 defines a window 39.

Next the ceramic member 30 is orientated with respect to the fixture member 36 such that the first planar surface 31 of the ceramic member 30 is facing the planar surface 37 of the fixture frame 36. Then ceramic member 30 is positioned on the fixture frame 36 such that each projection 38 extending from the fixture frame 36 locates in a respective one of the tubular setting mounts 34 in the first planar surface 31 of the ceramic member 30, as shown in FIGS. 3c) and 3d). It is to be noted that the fixture frame 36 contacts a peripheral region of the first planar surface 31 of the ceramic block 30. The ceramic member 30 is maintained on the fixture frame 36 for a time sufficient for the adhesive 35 to set and fix the tubular setting mounts 34 at the predetermined positions to provide a ceramic article 30 with location features and then the ceramic article 30 is removed from the fixture frame 36 for storage, as shown in FIG. 3e).

In this example the fixture frame 36 has a projection 38 provided on the planar surface 37 at each one of the corners of a rectangle and the first planar surface 31 of the ceramic block 30 is substantially rectangular and a hole 32 and a respective tubular mount 34 is provided at each one of the corners of the rectangular planar surface 31 of the ceramic block 30. The fixture frame 36 also has a projection 38 provided on the planar surface 37 on each side of the rectangle and the ceramic block 30 has a hole 32 and a tubular mount 34 provided on each side of the rectangular first planar surface 31.

The holes 32 may be circular, rectangular or square in cross-section. The holes 32 may have a uniform cross-sectional area along their lengths, or may taper. The tubular setting mounts 34 may be cylindrical, rectangular or square. The tubular setting mounts 34 may have a uniform cross-sectional area along their lengths, or may taper. The tubular setting mounts 34 may be annular in cross-section, e.g. the tubular setting mounts may have a cylindrical inner surface and a cylindrical outer surface. The projections 38 may be circular, rectangular or square in cross-section. The projections 38 may have a uniform cross-sectional area along their lengths, or may taper. The projections 38 may be cylindrical. In this example the holes 32 are circular, the tubular setting mounts 34 are cylindrical and the projections 38 are cylindrical.

The ceramic block 30 has the tubular setting mounts 34 mounted in the holes 32 in the first planar surface 31 of the ceramic block 30 at predetermined, known, positions which correspond to the predetermined positions of the projections extending from the planar surface 37 of the fixture frame 36. Thus, the ceramic block 30 may be consistently located, or re-located, on the fixture frame 36 using the tubular setting mounts 34 which are at the predetermined positions.

An advantage of the present disclosure is that the adhesive 35 is able to compensate for variability in the ceramic block 30 and as a consequence the ceramic block 30 may be repetitively located with high accuracy independently of deformation of the ceramic block 30. The internal diameter of the holes 32 in the ceramic block 30 may be 20% greater than the external diameter of the tubular setting mounts 34, although this may be greater or less. A loose tolerance is placed on the diameter and the position of the holes 32 within the planar surface 31 of the ceramic block 30. In order for the ceramic block 30 to be acceptable each projection 38 and associated tubular mount 34 must be able to fit within the bounds of the corresponding pre-made hole 32 in the ceramic block 30.

Figure 4:
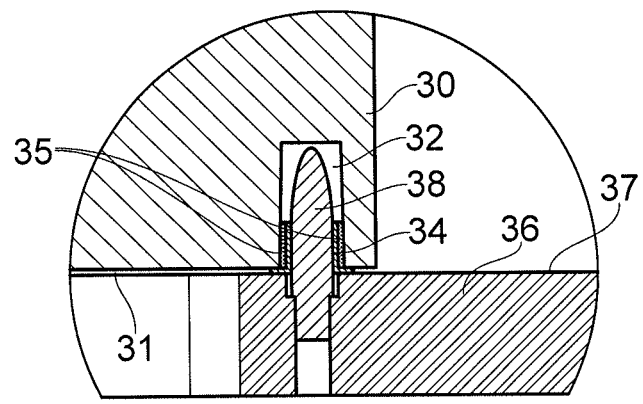
FIG. 4 is an enlarged cross-sectional view through a portion of the ceramic prismatic article and an associated fixture member shown in FIGS. 3d).
Figure 5:
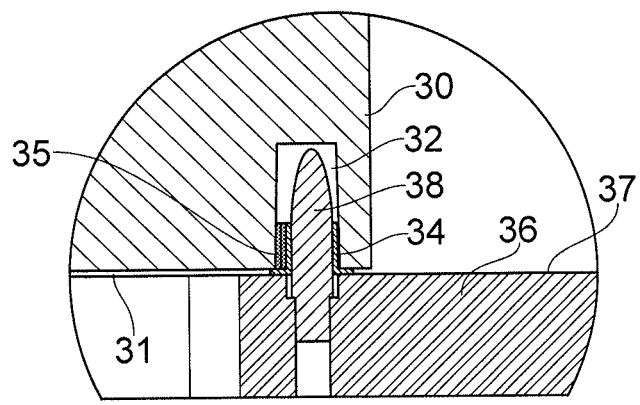
FIG. 5 is an enlarged cross-sectional view through a further portion of the ceramic prismatic article and an associated fixture member shown in FIG. 3d).

FIG. 4 shows an enlarged cross-sectional view through one of the holes 32 in the planar surface 31 of the ceramic block 30 and the corresponding projection 38 extending from the planar surface 37 of the fixture frame 36. FIG. 5 shows an enlarged cross-sectional view through another one of the holes 32 in the planar surface 31 of the ceramic block 30 and the corresponding projection 38 extending from the planar surface 37 of the fixture frame 36. It is to be noted that there is a positional difference of the projections 38 with respect to the holes 32 in FIGS. 4 and 5. In FIG. 4 the projection 38 is positioned substantially coaxially within the respective hole 32, whereas in FIG. 5 the projection 38 is offset from the axis of the respective hole 32. The adhesive 35 accommodates the variability in the position of each hole 32 in the ceramic block 30 relative to the associated projection 38 on the fixture frame 36 by securing each tubular mount 34 in the respective hole 32 in the ceramic block 30 at the required predetermined positions relative to the fixture frame 36.

Thus, any suitable number of projections may be used. The present disclosure has been successfully tested using three and six projections on the fixture frame and three and six holes in the ceramic block. It is believed that more than six projections and six holes may be used. It is believed that higher levels of locational accuracy are achievable with greater number of projections and holes because clearance errors between projections and holes are averaged across multiple projections and holes.

A fixture 29 for the ceramic article is provided. The fixture comprises a fixture frame 36, a clamping frame 41, removable fasteners 45 and a damping member as shown in FIG. 6. The fixture frame 36 has a window 39 and plurality of projections 38. The fixture frame 36 and the projections 38 may comprise a suitable metal, e.g. aluminium or steel. The clamping frame 41 defines a window 43. The clamping frame 41 may comprise a suitable metal, e.g. aluminium or steel. The windows 39 and 43 of the fixture frame 36 and the clamping frame 41 may have the same shape and cross-sectional area. The damping member, e.g. a rubber member, may be positioned between the clamping frame 41 and the second planar surface 33 of the ceramic block 30. The clamping frame 41 is securable to the fixture frame 36 by a plurality of removable fasteners, e.g. bolts, screws, etc., 45 which extend through aligned holes 51 and 49 in the clamping frame 41 and the fixture frame 36 respectively to enable the ceramic block 30 to be securely clamped between the fixture frame 36 and the clamping frame 41.

Figure 3:
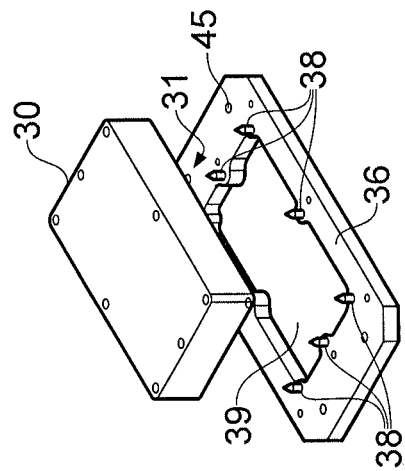
FIGS. 3a) to 3e) are schematic perspective views of steps in a method of providing location features on a ceramic prismatic article in a method of providing fixturing for a ceramic article according to the present disclosure.
Figure 3:
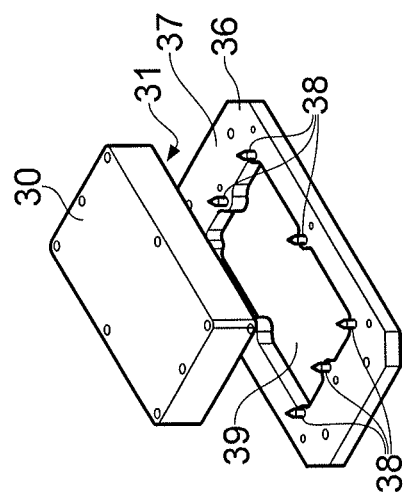
Figure 3:
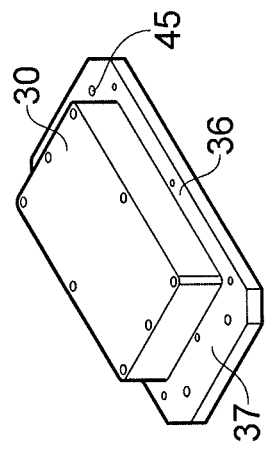
Figure 3:
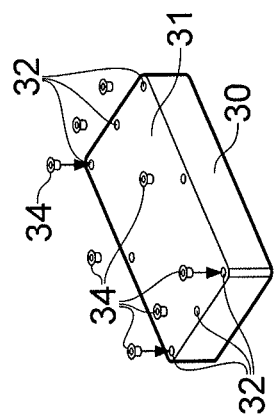
Figure 3:
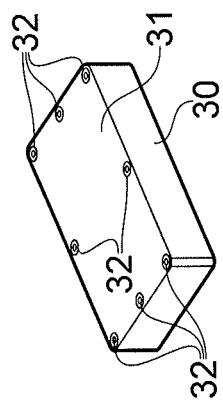

A method of machining a ceramic article comprises providing the location features on the ceramic block 30 as described with reference to FIGS. 3 to 5. FIGS. 6a) to 6e) shows the steps for producing a machined ceramic article 42 from a ceramic block 30. In FIG. 6a) a ceramic block 30 is taken from storage and placed on a fixture frame, now known as a fixture frame, 36 or the ceramic block 30 remains on the fixture frame, fixture frame, 36 such that the projections 38 of the fixture frame 36 are located in the tubular setting mounts 34 of the ceramic block 30. In FIG. 6b) a clamping frame 41 is arranged to contact the second planar surface 33 of the ceramic block 30. The clamping frame 41 defines a window 43 and it is to be noted that the clamping frame 41 contacts a peripheral region of the second planar surface 33 of the ceramic block 30. The windows 39 and 43 of the fixture frame 36 and the clamping frame 41 may have the same shape and cross-sectional area. A damping member, e.g. a rubber member, may be positioned between the clamping frame 41 and the second planar surface 33 of the ceramic block 30. The clamping frame 41 is secured to the fixture frame 36 by the plurality of removable fasteners, e.g. bolts, screws, etc., 45 which extend through aligned holes 51 and 49 in the clamping frame 41 and the fixture frame 36 respectively so that the ceramic block 30 is securely clamped between the fixture frame 36 and the clamping frame 41, e.g. is mounted in the fixture 29.

In FIG. 6c) the fixture frame 36 is mounted in a machine tool (not shown) such that the ceramic block 30 is mounted for machining. The fixture frame 36 has datum features, e.g. holes 53, to enable it to be mounted, or fastened, e.g. bolted, on the machine tool. In this case the fixture 29 is arranged in the machine tool such that the fixture frame 36, and window 39, is clamped against the machine tool and the clamping frame 41 and window 43 are accessible to a tool 55 of the machine tool. The second planar surface 33 of the ceramic block 30 is rough machined using the tool 55 of the machine tool which is moved in x, y and z directions to machine the ceramic block 30, as shown in figurer 6c). The tool 55 machines the ceramic block 30 within the confines of the window 43 defined by the clamping frame 41. The machining may comprise milling, drilling, grinding etc.

The fixture 29 is removed from the machine tool and the fixture 29 is re-mounted in the machine tool such that the clamping frame 41, and window 43, is clamped against the machine tool and the fixture frame 36 and window 39 are accessible to the tool 55 of the machine tool. The first planar surface 31 of the ceramic block 30 is rough machined using the machine tool 55 which is moved in x, y and z directions to machine the ceramic block 30, as shown in figurer 6d). The machine tool 55 machines the ceramic block 30 within the confines of the window 39 defined by the fixture frame 36. The machining may comprise milling, drilling, grinding etc.

FIG. 6e) shows that the ceramic block 30 is semi-finish machined on both sides either by semi-finish machining what was the first planar surface of the ceramic block 30 and then removing the fixture 29 and re-mounting the fixture 29 to enable what was the second planar surface of the ceramic block 30 to be semi-finish machined or by removing the fixture 29 and re-mounting the fixture 29 to enable what was the second planar surface of the ceramic block 30 to be semi-finish machined and then removing the fixture 29 and re-mounting the fixture 29 to enable what was the first planar surface of the ceramic block 30 to be semi-finish machined.

FIG. 6*f*) shows that the ceramic block 30 is finish machined on both sides either by finish machining what was the first planar surface of the ceramic block 30 and then removing the fixture 29 and re-mounting the fixture 29 to enable what was the second planar surface of the ceramic block 30 to be finish machined or by removing the fixture 29 and re-mounting the fixture 29 to enable what was the second planar surface of the ceramic block 30 to be finish machined and then removing the fixture 29 and re-mounting the fixture 29 to enable what was the first planar surface of the ceramic block 30 to be finish machined.

FIG. 6*g*) shows the ceramic block after it has been machined to produce a machined ceramic article 40 located in a rectangular ceramic frame 42 and the holes (not shown) are positioned in the planar surface on the rectangular ceramic frame 42. The machined ceramic article 40 in this example is a ceramic casting core for investment casting. The ceramic casting core may be a ceramic casting core for a turbine blade or for a turbine vane. It is also to be noted that the machined ceramic article, e.g. ceramic casting core, 40 is connected to the rectangular ceramic frame 42 by a plurality of ceramic support members (not shown).

It may not be necessary to have the semi-finish machining steps.

The fixture 29 and ceramic block 30 may be removed from the machine tool for additional operations for example inspection, repair.

A method of investment casting comprises providing the location features on a ceramic prismatic article in a method of providing fixturing for a ceramic article as described with reference to FIGS. 3 to 5. Then the ceramic block 30 is mounted on a machine tool using the fixture 29 and is machined to the required shape and dimensions for a required ceramic casting core 40, and then the machined ceramic casting core 40 is removed from the machine tool, as described with reference to FIGS. 6*a*) to 6*g*). The ceramic casting core is then encapsulated in a fugitive material pattern, a ceramic shell is provided around the fugitive material pattern, the fugitive material pattern is removed from the ceramic shell and ceramic casting core, molten metal is poured into the ceramic shell and the molten metal is solidified to form a metal article, and then the ceramic casting core and the ceramic shell are removed from the metal article. The fugitive material may be wax. The metal article may be a turbine blade or a turbine vane. The metal may be a nickel base superalloy, a cobalt base superalloy or an iron base superalloy.

In a first method of investment casting the ceramic casting core 40 is removed from the rectangular ceramic frame 42 shown in FIG. 6*g*). The ceramic casting core 40 is then positioned in a die and wax is injected into the die to form a wax pattern 46 of a turbine blade, e.g. the ceramic casting core 40 is encapsulated in a wax pattern 46.

Figure 8:
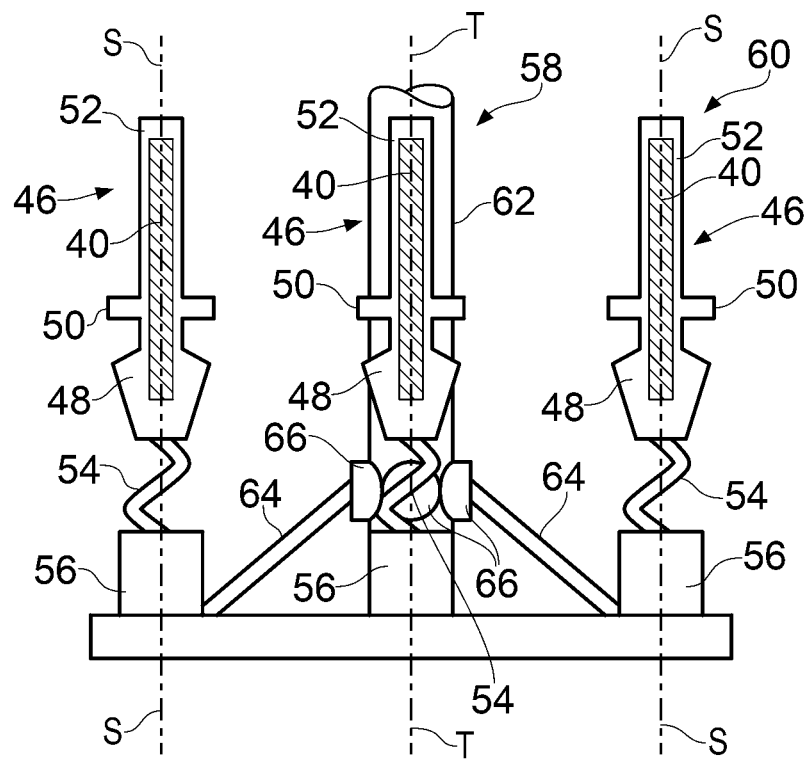
FIG. 8 is a view of a wax mould assembly used in a method of investment casting using a ceramic article according to the present disclosure.

A wax mould assembly 60, as shown in FIG. 8, comprises a plurality of wax patterns 46 suitable for making turbine blades or turbine vanes for a gas turbine engine 10. Each of the wax patterns 46 comprises a first part 48, which defines the shape of the root of the resulting cast turbine blade, a second part 50, which defines the shape of the platform of the cast turbine blade and a third part 52, which defines the shape of the aerofoil of the resulting cast turbine blade. Each wax pattern 46 contains a ceramic casting core 40 which defines the internal cooling passage or passages of the resulting cast turbine blade or turbine vane. The turbine blades to be cast in this example are single crystal turbine blades and therefore an associated wax selector part 54 and wax starter part 56 are connected to each wax pattern 46. The wax selector part 54 in this example is a wax helix, although other suitable selectors may be used. The wax patterns 46 and associated wax selectors 54 and wax starters 56 are arranged together on a wax gating tree 58 to form the wax mould assembly 60. The wax gating tree 60 comprises a wax runner which includes a first subsection 62 and a plurality of second subsections 64. The central axes S of the wax patterns 46 are arranged substantially parallel to, and spaced from, the central axis T of the first subsection 62 of the wax gating tree 58. Each second subsection 64 of the wax gating tree 58 interconnects the first subsection 62 of the wax gating tree 58 and a respective one of the wax starters 56. The wax gating tree 58 may also include a plurality of ceramic filters 66, one for each second subsection 64.

The wax mould assembly 60 including the wax patterns 46 is immersed in liquid ceramic slurry and has refractory granules sprinkled on the gelling liquid ceramic slurry to produce a layer of ceramic. The process of immersing the wax mould assembly 60 in liquid ceramic slurry and sprinkling with refractory granules is repeated until the thickness of the ceramic is sufficient for the particular application. The thickness of ceramic normally used is 6 mm to 12 mm.

Figure 9:
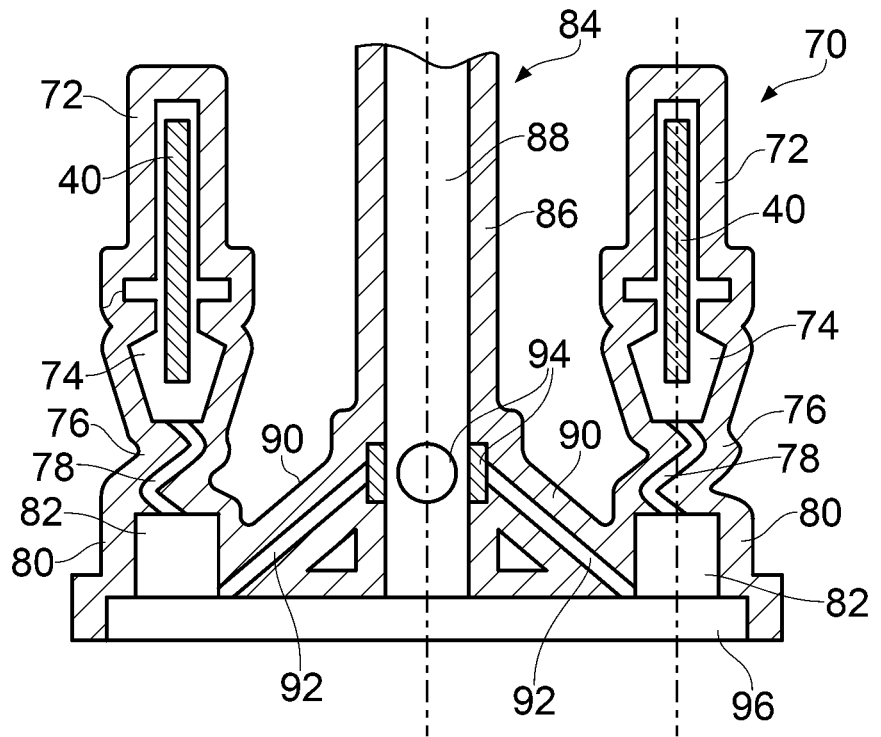
FIG. 9 is a cross-sectional view through a mould assembly used in a method of investment casting using a ceramic article according to the present disclosure.

FIG. 9 shows a ceramic shell mould 70 for casting a single crystal turbine blade made from the wax mould assembly 60 shown in FIG. 8. The ceramic shell mould 70 comprises a plurality of article portions 72 each of which has an article chamber 74 to define the turbine blade. A ceramic casting core 40 is positioned within each of the article portions 72 as mentioned above to define the internal cooling passage or passages of the resulting cast turbine blade. Each of the article portions 72 of the ceramic shell mould 70 has an associated selector portion 76, which has a selector passage 78, and an associated starter portion 80 which has a starter chamber 82. Each selector passage 78 is connected to its associated article chamber 74 and a first end of each starter chamber 82 is connected to its associated selector passage 78 and a second end of each starter chamber 82 is open. The ceramic shell mould 70 also comprises a runner portion 84 to convey molten metal to the article portions 72 via the starter and selector portions 80 and 76 respectively. The runner portion 84 includes a single first subsection 86 which has a first runner passage 88 and a plurality of second subsections 90 which have second runner passages 92. The second runner passages 92 interconnect the first runner passage 88 to the article chambers 74 via the starter chambers 82 and the selector passages 78. The ceramic filters 94 are provided in the ceramic shell mould 70 to filter the molten metal as it flows from the first runner passage 88 to the second runner passages 92. The ceramic shell mould 70 has a recess 96 which is arranged to fit on a chill plate during the single crystal casting process.

Molten metal is poured into the ceramic shell mould 70 and the molten metal flows through the first runner passage 88, the ceramic filters 94 and the second runner passages 92 to the starter chambers 82. The molten metal then flows upwardly through the starter chambers 82 and the selector passages 78 to the article chambers 74. In the single crystal casting process the second open ends of the ceramic shell mould 70 are placed onto a chill plate located in the recess 96 of the ceramic shell mould 70. The chill plate causes solidification of the molten metal to occur, and the chill plate and the ceramic shell mould 70 are withdrawn slowly from the casting furnace to produce directional solidification of the molten metal within each of the starter chambers 82 of the ceramic shell mould 70. Each selector passage 78 selects a single crystal from a plurality of directionally solidifying crystals in the associated starter chamber 82 of the ceramic shell mould 70 and the single crystal grows into the associated article chamber 74 to produce a cast single crystal turbine blade.

In a second method of investment casting the ceramic casting core 40 is maintained in the rectangular ceramic frame 42 shown in FIG. 6g). The rectangular ceramic frame 42 and the ceramic core 40, machined from ceramic block 30, are then mounted in a wax encapsulation tool 100, as shown in FIG. 7a). The wax encapsulation tool 100 comprises portions 102, 104 and 106 and also has a wax injection passage 108 to supply wax into the injection tool 100. The portions 102, 104 and 106 of the wax encapsulation tool 100 are then clamped together around the rectangular ceramic frame 42 and ceramic core 40. Then wax is injected through the wax injection passage 108 into the wax encapsulation tool 100 and around the ceramic casting core 40 to encapsulate the ceramic casting core 40 in wax 44, as shown in FIG. 6b). The wax 44 is allowed to cool and set. Then the rectangular ceramic frame 42, the ceramic casting core 40 and encapsulating wax 44 are removed from the wax injection tool 100 as shown in FIG. 7c). The rectangular ceramic frame 42 is then placed in a fixture 29 comprising a fixture frame 36, a clamping frame 41 and fasteners 45 as described previously, as shown in FIG. 7d). The fixture 29 is then placed in a machining tool in a manner, as described previously.

In FIG. 7e) the fixture frame 36 is mounted in a machine tool (not shown) such that the ceramic frame 42 is mounted for machining. The fixture frame 36 has datum features, e.g. holes 53, to enable it to be mounted, or fastened, e.g. bolted, on the machine tool. In this case the fixture 29 is arranged in the machine tool such that the fixture frame 36, and window 39, is clamped against the machine tool and the clamping frame 41 and window 43 are accessible to a tool 55 of the machine tool. A first side of the wax 44 is rough machined using the tool 55 of the machine tool which is moved in x, y and z directions to machine the wax 44, as shown in figurer 7e). The tool 55 machines the wax 44 within the confines of the window 43 defined by the clamping frame 41. The machining may comprise milling, drilling, grinding, using a fluted tool, etc.

The fixture 29 is removed from the machine tool and the fixture 29 is re-mounted in the machine tool such that the clamping frame 41, and window 43, is clamped against the machine tool and the fixture frame 36 and window 39 are accessible to the tool 55 of the machine tool. The opposite side, or second side, of the wax 44 is rough machined using the tool 55 of the machine tool which is moved in x, y and z directions to machine the wax 44, as shown in figurer 70. The tool 55 machines the wax 44 within the confines of the window 39 defined by the fixture frame 36. The machining may comprise milling, drilling, grinding, using a fluted tool etc.

FIG. 7g) shows that the wax 44 is finish machined on the second side by maintaining the fixture 29 in the machining tool and finish machining the second side of the wax 44 and then removing the fixture 29 and re-mounting the fixture 29 such that the fixture frame 36, and window 39, is clamped against the machine tool and the clamping frame 41 and window 43 are accessible to the tool 55 of the machine tool to finish machine the first side of the wax 44 to form the wax pattern 46 around the ceramic casting core 40. Alternatively, the fixture 29 may be removed and re-mounted to enable the first side of the wax 44 to be finish machined and then the fixture 29 is removed and re-mounted to enable the second side of the wax 44 to be finish machined to form the wax pattern 46 around the ceramic casting core 40.

FIG. 7h) shows the tool 55 of the machine tool machining the ceramic support members connecting the ceramic casting core 40 to the rectangular ceramic frame 42 to release the ceramic casting core 40 and wax pattern 46 from the fixture 29. Finally, the wax pattern 46 is removed from the rectangular ceramic frame 42 as shown in FIG. 7d) and assembled into a wax mould assembly 60 as described previously.

The tool 55 of the machining tool machines the wax 44 to the required shape around the ceramic casting core 40 to form a wax pattern 46 while the ceramic casting core 40 is held by the rectangular ceramic frame 42 in the fixture 29, as shown in FIG. 7c).

The advantage of this method is that it allows the ceramic block to be machined into a ceramic casting core, it allows the ceramic casting core to be encapsulated with wax and it allows the wax of the wax encapsulated ceramic casting core to be machined into the shape of a wax pattern of an article to be cast using a consistent, accurate, reference frame, e.g. the predetermined positions of the tubular setting mounts in the ceramic block.

Rubber or plastic bungs may be inserted into the tubular setting mounts 34 prior to rectangular ceramic frames 42 and ceramic casting cores 40 being placed in storage or prior to the rectangular ceramic frames 42 and ceramic casting cores 40 being immersed or dipped in impregnating materials that strengthen the ceramic materials for various processes. The rubber or plastic bungs are removed to enable the rectangular ceramic frame 42 to be mounted in a fixture 29 of a machine tool or other manufacturing process.

A further method of providing location features on a ceramic article in a method of providing fixturing for a ceramic article according to the present disclosure is shown in FIGS. 10 and 11. The method of providing location features on a ceramic article comprises providing a ceramic member 130 having a plurality of substantially parallel holes 132 extending into the ceramic member 130, as shown in FIG. 10. In this example the ceramic member 130 is an aerofoil shaped ceramic member 30 having end pieces 131A and 131B and each end piece 131A and 131B has a plurality of substantially parallel holes 132 extending into the ceramic member 130. The holes 132 may be provided in the ceramic member 130 after the ceramic member 130 has been sintered, for example the holes 132 may be provided in the end pieces 131A and 131B of the ceramic member 130 by drilling. Alternatively, the holes 132 may be provided in the end pieces 131A and 131B of the ceramic member 130 during the injection moulding of the ceramic into an injection moulding die and the ceramic member 130 with holes 132 is then sintered. The holes 132 may be provided in the end pieces 131A and 131B of the ceramic member 130 during the injection moulding of the ceramic into the die by providing projections extending into the injection moulding die. The ceramic member 30 may comprise any suitable ceramic for example zirconia, yttria, alumina, silica, zircon or a mixture of one or more of these for example a blend of alumina, silica, zircon, zirconia and yttria.

One or more carriage members 136 are provided and each carriage member 136 has a plurality of substantially parallel projections 138 extending from the carriage member 136 at predetermined positions, as shown in FIG. 11. In this example there are two carriage members 136 and each carriage member 136 comprises a framework. Each carriage member 136 and the projections 138 may comprise a suitable material for example a plastic material, e.g. polytetrafluoroethylene (PTFE), nylon, a copolymer of acrylonitrile-butadiene-styrene (ABS), acrylates, epoxy resin etc. The carriage members 136 may be manufactured by additive layer manufacture (ALM), e.g. by direct laser deposition (DLD) or powder bed laser deposition or the carriage members 136 and projections 138 may be manufactured by injection moulding for higher production volumes. Each carriage member 136 has a plurality of T-shaped members 144 extending therefrom each of which locates in a corresponding T-shaped slot 142 in a rectangular frame 140. Each carriage member 136 is secured to the rectangular frame 140 by a plurality of screws 146 which are threaded through holes 148 in the rectangular frame 140 and press on the T-shaped members 144 in the T-shaped slots 142.

Next the ceramic member 130 is positioned on the carriage members 136 such that each projection 138 extending from the carriage members 136 locates in a respective one of the holes 132 in the ceramic member 130, as shown in FIG. 10. Then an adhesive is loaded into each of the holes 132 in the ceramic member 130 and around each of the projections 138 on the carriage members 136 and the ceramic member 130 is maintained on the carriage members 136 for a time sufficient for the adhesive to set and fix the ceramic member 130 at the predetermined positions to provide a ceramic member 130 with datum features and then the ceramic member 130 and the carriage members 136 are removed from the rectangular frame 140. The T-shaped members 144 of the carriage members 136 provide the datum features for the ceramic member 130 and enable the ceramic member 130 to be mounted into a machine tool for machining processes. The rectangular frame 140 may comprise a suitable material, for example a plastic material or a metal, e.g. aluminium.

In this example each carriage member 136 has the projections 138 arranged in a respective line and the ceramic member 130 has the holes 132 provided in a line at each end 131A and 131B of the ceramic member 130.

The holes 132 may be circular, rectangular or square in cross-section. The projections 138 may be circular, rectangular or square in cross-section. The projections 138 may be cylindrical. In this example the holes 132 are circular and the projections 138 are cylindrical.

One of the holes 132 in the ceramic member 130 is arranged to be a primary datum hole and the geometry of the primary datum hole is arranged to closely match the geometry of the projections 138 on the carriage members 136. All of the other holes 132 are oversized to accommodate distortion of the ceramic member 130 due to sintering or prior manufacturing processes. Once the ceramic member 130 is loaded into the carriage members 136 the oversized holes 132 are filled with adhesive to fix the ceramic member 130 relative to the carriage members 136.

The carriage members enable the ceramic member to be moved between different machining processes, or different manufacturing processes, and enable the ceramic member to be consistently located for each of the different machining or manufacturing processes. The carriage members prevent damage or chipping of the ceramic member and any clamping forces, stress due to the removal or insertion into a fixture, or dynamic manufacturing loads are absorbed by the carriage members. The positions of the projections on the carriage members may be easily verified to allow in process metrology to monitor the position of the carriage members.

For example when the ceramic member and carriage members are moved from one machining process to another machining process the positions of the projections on the carriage members may be checked before and after the move to allow the alignment of the machining process at each stage. The adhesive may be any suitable glue or wax which retains the projections in the holes in the ceramic member and which may be removed after all the machining processes, or manufacturing processes, have been completed, e.g. epoxy, cyanoacrylate, acrylic or thermoset polymer. Alternatively, a single carriage member comprising a rectangular framework may be used.

Figure 12:
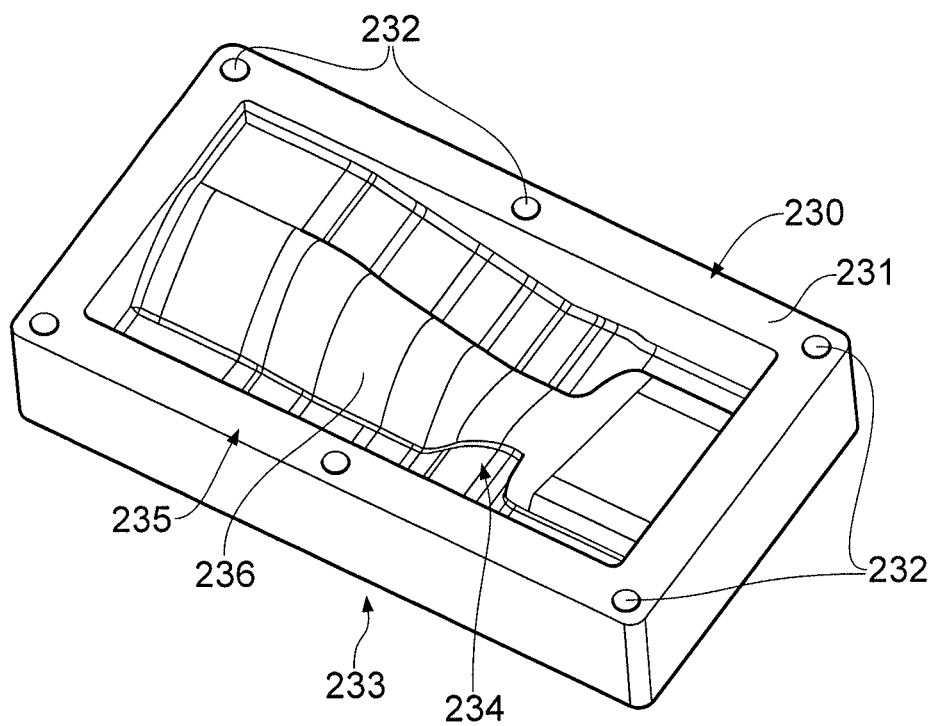
FIG. 12 is a perspective view of a further ceramic article which is used in a method of providing location features on a ceramic article in a method of providing fixturing for a ceramic article according to the present disclosure.

FIG. 12 shows an alternative ceramic article which comprises a ceramic member 230 having a plurality of substantially parallel holes extending into the ceramic member 230. In this example the ceramic member 230 comprises a central portion 234 and a frame 235 surrounding the central portion 234. The frame 235 of the ceramic member 230 has a planar surface 231 and the planar surface 231 has a plurality of substantially parallel holes 232 extending into the frame 235. The central portion 234 of the ceramic member 230 has first contoured surface 236 spaced from the planar surface 231. The frame 235 of the ceramic member 230 may have a second planar surface 233 and the planar surface 233 has a plurality of substantially parallel holes (not shown) extending into the frame 235. The central portion 234 of the ceramic member 230 has second contoured surface 236 spaced from the spaced from the first planar surface 231 and spaced from the second planar surface 233. The first contoured surface 236 is recessed from the first planar surface 231 of the frame 235 into the ceramic member 230 towards the second planar surface 233 of the frame 235. Similarly the second contoured surface is recessed from the second planar surface 233 of the frame 235 into the ceramic member 230 towards the first planar surface 231 of the frame 235. The ceramic member 230 is produced by injecting ceramic into a suitably shaped die. The ceramic member 230 may be provided with datum features using the steps shown if FIGS. 3a) to 3e). The advantage of this arrangement is that it produces a near net shape which requires less machining to produce a ceramic core. This may be used in any of the machining method described with reference to FIGS. 6a) to 6g) except the rough machining steps may not be required. This may be used in any of the investment casting methods described with reference to FIGS. 7a) to 7j) and FIGS. 8 and 9.

Figure 13:
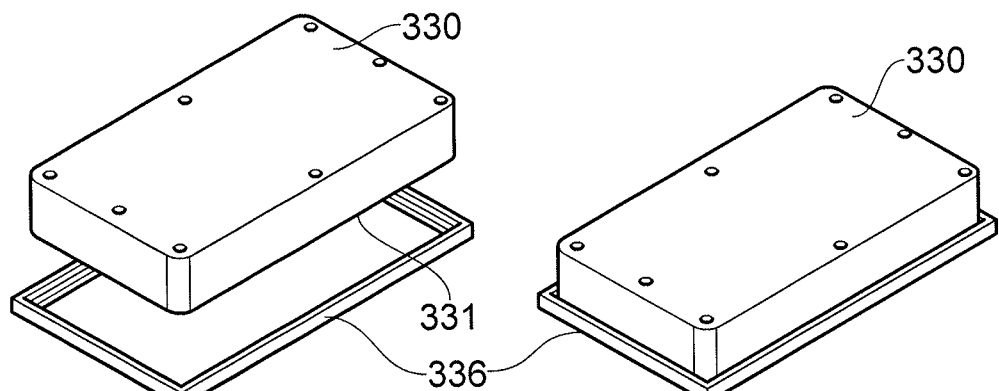
FIG. 13 are perspective views of a further ceramic article which is used in another method of providing location features on a ceramic prismatic article in a method of providing fixturing for a ceramic article according to the present disclosure.

FIG. 13 shows a further alternative ceramic article which comprise a ceramic member 330. In this example the ceramic member is a prismatic ceramic block 330 having a first planar surface 331. The ceramic block 330 is adhesively bonded to a plastic member 336. The plastic member 336 has a wall extending therefrom and the wall extends around the whole of the periphery of the plastic member 336. The ceramic block 330 is retained in positon by the wall of the plastic member 336 and is adhesively bonded to the wall. The plastic member 336 may comprise a suitable plastic material, e.g. nylon, polytetrafluoroethylene (PTFE), polycarbonate etc. or other suitable plastic material. The plastic member 336 may be a plastic tray or a plastic frame. The plastic tray may be adhesively bonded to the whole of the first planar surface 331 of the ceramic block 330 whereas the plastic frame may be adhesively bonded to a peripheral region only of the first planar surface 331 of the ceramic block 330. The advantage of the plastic member is that it provides a wear resistant repeatable surface for location, for providing a datum, while allowing for variations in the ceramic block to be accommodated during the setting procedure. The plastic tray or plastic frame forms a setting mount for the ceramic block 330. The plastic tray or plastic frame may provide the datum features for machining the ceramic block. The plastic tray/frame may be mounted between a fixture frame and a clamping member/frame in a similar manner to that described above. This may be used in any of the machining methods described with reference to FIGS. 6a) to 6g). This may be used in any of the investment casting methods described with reference to FIGS. 7a) to 7j) and FIGS. 8 and 9. The plastic tray/frame may locate in a recess in the surface of the fixture frame e.g. on a ledge around periphery of the window of the fixture frame.

Figure 14:
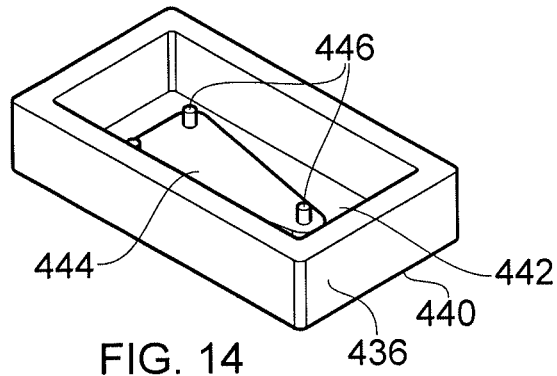
FIG. 14 is a perspective view of a further fixture which is used in another method of providing location features on a ceramic prismatic article in a method of providing fixturing for a ceramic article according to the present disclosure.

FIG. 14 shows an alternative fixture 436 which comprises a rectangular frame 440, a plate 442 at a first end of the frame 440 and a setting member 444 located on the plate 442 and surrounded by the frame 440. The setting member 444 has a plurality of parallel projections 446 extending away from the setting member 444 and arranged to locate in holes in a ceramic member, ceramic block (not shown). The setting member 444 of the fixture 436 locates the ceramic block in the z direction and prevents rotation of the ceramic member and the frame 440 locates the ceramic member in the x and y directions. The ceramic member rests on the setting member 444 and the periphery of the ceramic member may be glued to the frame 440 for machining of the ceramic member and the glue is removed once the ceramic block has been machined. The parallel holes in the ceramic member may be provided with tubular setting mounts. The rectangular frame 440, plate 442 and setting member 444 may comprise a suitable metal for example aluminium. The setting member 444 may be manufactured by additive layer manufacturing, e.g. DLD or SLS.

In all of the embodiments described which have holes, the holes may be any suitable shape and the projections may be any suitable shape which may be inter-engaged to accommodate variability in the ceramic member and provide a consistent datum feature. The shapes of the holes and projections may be selected, e.g. provide greater surface area of contact, to enhance the bonding of the adhesive to the projections and/or the surfaces of the corresponding holes in the ceramic member.

Although the description has referred to positioning the ceramic member on a fixture member which has a plurality of projections it may be equally possible to provide a separate setting member, setting plate or setting frame which has projections in the same relative positions as the fixture member, fixture plate or fixture frame to set the tubular setting mounts in the ceramic member. The ceramic member is then removed from the setting member and placed on the fixture member for machining.

Thus an advantage of the present disclosure it that it allows a ceramic member to be repeatedly and consistently accurately mounted for different machining processes or other manufacturing processes. It is believed that the present disclosure enables ceramic members with millimetre magnitude variations to be located repeatedly to within tens of micrometres.

Although the present disclosure has referred to single crystal casting it is equally applicable to directional solidification casting or to conventional equi-axed casting. Although the present disclosure has referred to casting turbine blades or casting turbine vanes it is equally applicable to casting other hollow articles, for example casting light alloy structural articles, e.g. aluminium alloy articles, magnesium alloy articles.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of investment casting, comprising:
providing a ceramic member having a planar surface with a plurality of substantially parallel rows, each row comprising a plurality of holes;
providing at least one tubular setting mount, the ceramic member having the tubular setting mount;
providing at least one fixture member having at least one datum feature;
applying adhesive to a portion of an exterior surface of the ceramic member or applying adhesive to a corresponding portion of a surface of the at least one setting mount;
positioning the ceramic member on the fixture member such that the at least one setting mount locates the ceramic member on the fixture member;
maintaining the ceramic member on the at least one fixture member for a time sufficient for the adhesive to fix the ceramic member on the at least one setting mount to provide the ceramic member with at least one datum feature;
providing at least one clamping member, removably securing the clamping member to the fixture member to clamp the ceramic member between the fixture member and the clamping member;
removably locating the fixture member on a machine tool;
machining the ceramic member to the required shape and dimensions;
removing the machined ceramic member from the machine tool;
encapsulating the ceramic member in a fugitive material pattern;
providing a ceramic shell around the fugitive material pattern;
removing the fugitive material pattern from the ceramic shell and ceramic member;
pouring molten metal into the ceramic shell and solidifying the metal to form a metal article, the ceramic shell including interconnecting runner passages to convey the molten metal to form the metal article, the ceramic shell further including ceramic filters to filter the molten metal as it flows from a first of the interconnecting runner passages to a second of the interconnecting runner passages; and
removing the ceramic member from the metal article.

2. A method as claimed in claim 1 wherein the encapsulating the ceramic member in the fugitive material comprises maintaining the ceramic member clamped between the fixture member and the clamping member before encapsulating the ceramic member in a fugitive material pattern, removably locating the fixture member on a machine tool, machining the fugitive material pattern to the required shape and dimensions, removing the machined fugitive material pattern from the machine tool and removing the fixture member and the clamping member from the machined fugitive material pattern.

3. A method as claimed in claim 1 wherein the encapsulating the ceramic member in the fugitive material comprises removing the fixture member and the clamping member from the machined ceramic member before encapsulating the ceramic member in the fugitive material pattern.

4. A method as claimed in claim 1 wherein the fugitive material is wax.

5. A method as claimed in claim 1 wherein the metal article is selected from the group consisting of a turbine blade and a turbine vane.

6. A method as claimed in claim 1 wherein the metal is selected from the group consisting of a nickel base superalloy, a cobalt base superalloy and an iron base superalloy.

7. A method as claimed in claim 1 wherein the method comprises directionally solidifying the metal to form a directionally solidified metal article or to form a single crystal metal article.

* * * * *